United States Patent [19]

Sussmeyer et al.

[11] 4,437,940
[45] Mar. 20, 1984

[54] PROCESS FOR AUTOMATIC AND CONTINUOUS VAPORIZATION AND CONDENSATION

[75] Inventors: Robert Sussmeyer, Brussels; Alain Pluvinage, Irchonwelz; Christian Moenaert, Brussels, all of Belgium

[73] Assignee: Ateliers Sussmeyer SPRL, Belgium

[21] Appl. No.: 381,223

[22] Filed: May 24, 1982

[30] Foreign Application Priority Data

Jun. 4, 1981 [FR] France ............................. 81 11054

[51] Int. Cl.³ ............................................. F01D 9/02
[52] U.S. Cl. ................................. 203/49; 159/DIG. 2
[58] Field of Search ................. 203/49; 202/201, 203; 159/1 C, 16 R, 47 R, DIG. 2

[56] References Cited

U.S. PATENT DOCUMENTS 3,326,778 6/1967 Mock ................................... 203/49
4,090,922 5/1978 Bauer et al. ........................... 203/49

*Primary Examiner*—Frank Sever
*Attorney, Agent, or Firm*—Harness, Dickey & Pierce

[57] ABSTRACT

The invention, which is useful in the chemical industry, relates to an automatic and continuous vaporization and condensation process for the fractionation of mixtures by continuously heating, in a circulation circuit, a clean heat transfer gas which is subsequently injected into a mixture to be fractionated (16), of which at least one liquid fraction, which has separated off by vaporization, is condensed and collected while the heat transfer gas returns to the circulation circuit.

The process is preferentially applied to the recovery of solvents from paint, ink and varnish residues.

4 Claims, 1 Drawing Figure

U.S. Patent    Mar. 20, 1984    4,437,940
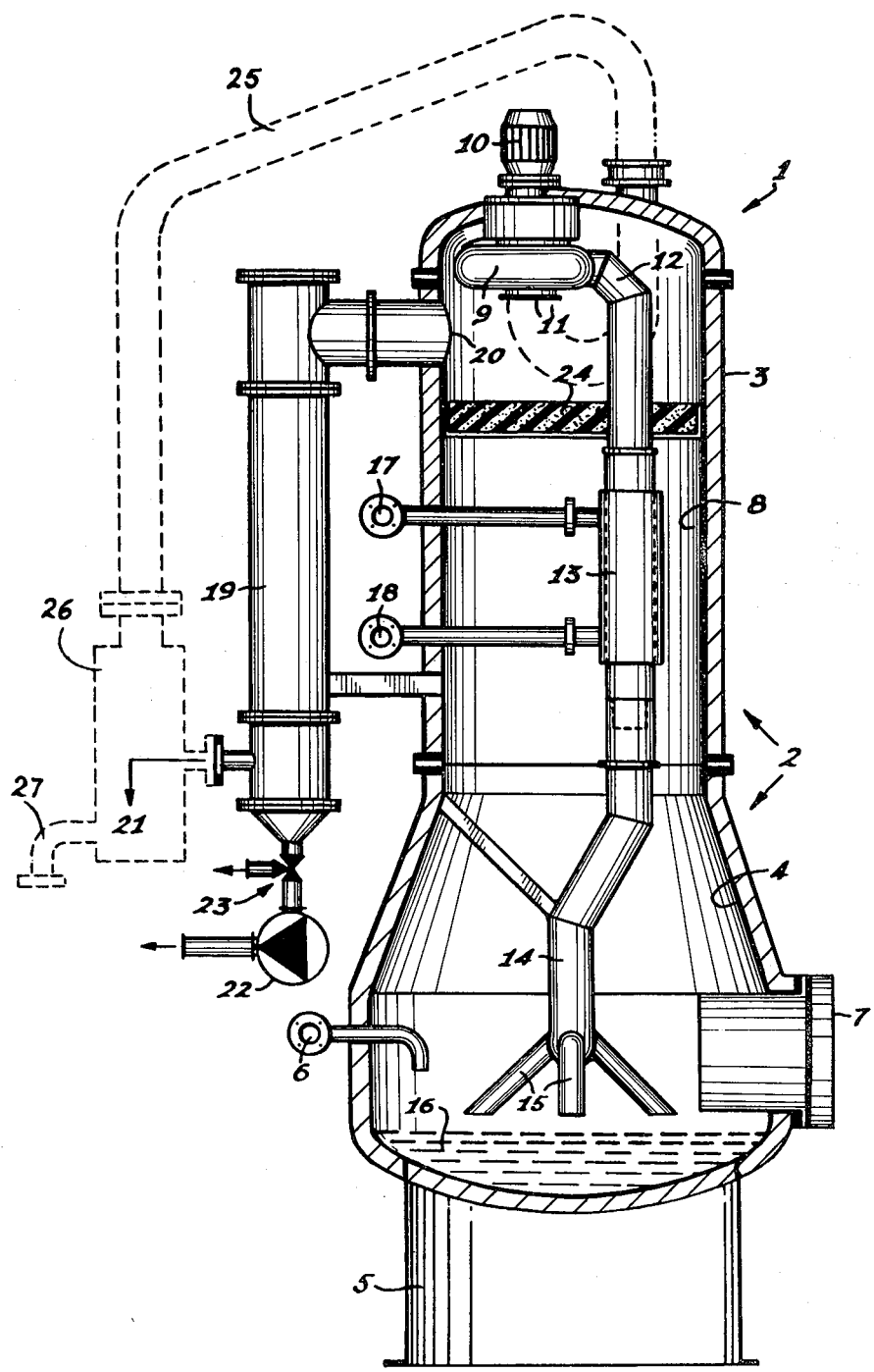

PROCESS FOR AUTOMATIC AND CONTINUOUS VAPORIZATION AND CONDENSATION

The present invention relates to a process and an apparatus for automatic and continuous vaporization and condensation.

Distillation and drying are two operations which employ the vaporization of a volatile phase and which find frequent application in the chemical and pharmaceutical industries. The manner in which the vaporization of the volatile phase is conducted is a decisive factor in the success of the operation both from the technical point of view, namely the quality of the fractions and residues obtained and the difficulty of the handling operations, and from the economic point of view, namely the investment costs and the operating costs.

In practice, it is the heat exchange surface across which the heat of vaporization is provided which attracts most attention. If the homogeneous, that is to say single-phase, mixture, or heterogeneous, that is to say polyphase, mixture, such as a suspension, a dispersion or a slurry, inter alia, contains a substance which is not inert under the working conditions, for example which is prone to pyrolysis or polymerization or is prone to undergo pasty fusion in the particular case of the solids of a polyphase mixture, the heating surface rapidly reaches a state of fouling which is such that continuing the vaporization becomes ruinously expensive or quite simply impossible.

If the treated mixture contains substances which are inflammable or very sensitive to heat, the provision of heat is traditionally effected by means of a heat transfer fluid, which is most commonly water, if appropriate in the form of steam, but the fact that a double heat exchange is employed can only increase the heat loss and hence the expense which has to be borne, without dealing with the problem of an excessive heat gradient in the treated mixture or of fouling of the exchange surface with which the mixture is in contact.

A particular field of industrial activity where distillation and drying must be carried out on mixtures which apparently make the fouling of the heat exchange surfaces inescapable is that of the treatment of residues of paints, varnishes, printing inks and similar mixtures. Because of the fact that this treatment combines the most diverse difficulties, the invention is described in more detail below with reference to this specific case, though it is obviously applicable to any operation which entails the same disadvantages as the recovery of solvents in the treatment of these residues.

The legal rules in respect of ecology in fact forbid discharging into the environment major amounts of polluting solvents containing various chemical agents, but an industrial firm does not always possess the complex and expensive apparatus required to recover the solvents and must hence have recourse to specialized firms. These distill, in bulk and on a large scale, the solvents employed and originating from very diverse sources, but this inevitably results in major differences of composition between the fresh solvents from one particular origin or another and the redistilled solvents, and these differences make recycling an uncertain operation for an application requiring a solvent with quite specific properties.

It is thus of obvious value to the users that they should have their own apparatus for recovering solvents, in a way which is reliable, reproducible and easy to carry out and gives, at all times, a recovered solvent of well defined composition.

A system whose application could be considered is that of steam stripping, the principle of which is to inject steam into the mixture to be treated so that a vapor phase forms which contains not only water vapor but also the vapor of the liquid which it is desired to recover. The total pressure of this vapor phase is the sum of the partial pressures of the water vapor and of the vapor of the other liquid, so that condensation will give a mixture of water and the other liquid, regardless of whether the latter is or is not water-miscible. It is however immediately obvious that the ratio of the partial pressures of water and the other liquid is the less in favor of the latter, the higher its boiling point is, and the result is, firstly, that the volumes to be treated become excessive if the other liquid has a very high boiling point and, secondly, that in practice complete extraction of the second liquid is impossible. Consequently, steam stripping leaves a residue which not only is not dry but moreover still contains a significant amount of polluting liquid.

From Belgian Pat. No. 806,305 there are also known apparatuses in which the heat exchange surface, instead of being solid, is a liquid surface, in the case in question the surface of a layer of oil or of a heat transfer liquid. It is obvious that this avoids the fouling of a solid surface. Though this method of working overcomes an important difficulty, it does not make it any the less necessary subsequently to remove the solids from the oil, which oil can moreover undergo interaction with certain solid residues, for example resins which cause the oil to gel.

Another system which can be envisaged is thin layer vaporization on a regularly scraped surface. Apparatuses of this type, which are conventionally used, especially in the foodstuff industries, operate less reliably in the recovery of solvents from residues of paints and other similar slurries, because the scraping of the resins, for example of polymerized epoxides, is not perfect.

The researches of the Applicants have led them to conceive a process and an apparatus, for automatic and continuous vaporization and condensation, which have the advantage of avoiding the shortcomings of the known systems referred to above, and whose principle is that the heat exchange surface is kept clean because of the fact that the heat exchange which provides the necessary heat to the system is effected by contact of this surface with a clean heat transfer gas.

Accordingly, the invention relates to an automatic and continuous vaporization and condensation process for the fractionation of mixtures, wherein a clean heat transfer gas is heated continuously in a circulation circuit, the heated heat transfer gas is injected into the mixture to be fractionated, to which it releases its heat, so that at least one liquid fraction leaves the mixture by vaporization, this vaporized fraction is condensed and collected continuously, and the heat transfer gas is recycled continuously to the circulation circuit.

According to a particular embodiment of this process, the heat transfer gas used has a critical temperature below the temperature at which the vaporized fraction is condensed, so that the heat transfer gas which separates from the vaporized fraction when the latter is condensed is recycled continuously to the circulation circuit.

According to a preferred embodiment of this process, the heat transfer gas consists of a part of the vaporized fraction, the remainder of the vaporized fraction being condensed and collected.

It should be noted that the operations can be effected in a chamber kept under atmospheric pressure, reduced pressure or superatmospheric pressure.

The invention also relates to an apparatus intended for carrying out the process in its various embodiments, which apparatus comprises:

a vaporization chamber, consisting of a cell equipped with a device for introducing a mixture to be fractionated, and a device for discharging the residue, the chamber being surmounted by a gas outlet column, a heat transfer gas circulation circuit, comprising a fan which can draw in a heat transfer gas and feed it into an outlet line, which outlet line passes through a heating device and carries, at its end, a distributor which brings the heat transfer gas into contact with the mixture to be fractionated, and a condenser, connected to the gas outlet column and suitable for the condensation and collection of the fraction which has been vaporized in the vaporization chamber.

In a particular embodiment of the apparatus, the latter comprises a return line for the heat transfer gas, which return line leads from the condenser to the fan.

According to a preferred embodiment of the apparatus, the fan inlet communicates with the upper zone of the vaporization chamber, the fan thus being able to draw in a part of the vaporized fraction which is formed in the vaporization chamber.

To prevent the gas circulation circuit being contaminated through mechanical entraining of liquid and solid particles, the apparatus advantageously comprises a mist separator located upstream of the condenser and, if the fan communicates with the upper zone of the vaporization chamber, also upstream of the fan.

If the fan communicates with the upper zone of the vaporization chamber, it is advisable to have the whole of the heat transfer gas circulation circuit located inside the vaporization chamber.

However, according to a particular embodiment of the apparatus, the heating device which forms part of the heat transfer gas circulation circuit is located outside the vaporization chamber.

In all the embodiments of the apparatus, very economical operation is assured by the fact that the vaporization chamber is protected from heat loss by one or more layers of heat-insulating material.

To ensure the greatest degree of safety, even in the treatment of mixtures having a low flashpoint, the heating device is a steam heat exchanger which receives live steam through one line and returns colder steam and/or condensation water through another line.

According to an advantageous embodiment of the apparatus, the heated gas distributor is a nozzle manifold, which delivers the heated gas with sufficient impulse to cause movements in the contents of the cell.

For carrying out operations under atmospheric pressure, reduced pressure or superatmospheric pressure, the apparatus possesses a device which maintains a constant pressure.

In order that the apparatus shall be able to function for a long period in continuous operation, the feed device of the cell is a continuously operating device and the device for discharging the residue from the cell is a continuously operating dry residue discharge device.

Frequently it suffices if the cell feed is continuous while the residue discharge device of the cell is a simple manhole which allows the dry residue to be removed at the end of a period of operation.

BRIEF DESCRIPTION OF DRAWING

The invention is additionally illustrated by the description of a specific embodiment of the apparatus, suitable for treating paint residues, which embodiment is shown in the attached drawing.

The apparatus 1 for carrying out the process of the invention, applied to the treatment of paint residues, comprises a vaporization chamber 2 protected from heat loss by a layer of heat-insulating material 3 and consisting of a lower cell 4 mounted on a base 5, the cell being equipped with a feed device 6 and a residue discharge device 7 (the latter in the present case being of the manhole type), and being surmounted with a gas outlet column 8; a gas circulation circuit in turn comprises, within the gas outlet column 8, a fan 9 which is operated by an electric motor 10 and whose intake 11 is located in the upper part of the vaporization chamber 2, while the outlet line 12 of the fan passes through a heat exchanger 13 and carries, at its lower end, a distributor 14 for heated gas, whose nozzles 15 terminate a short distance above the contents 16 of the cell 4. The heat exchanger 13 is a steam exchanger which receives live steam through the line 17 and returns colder steam and/or condensation water through the line 18, these two lines passing through the heat-insulated wall of the gas outlet column 8. The gas circulation circuit is completed, outside the vaporization chamber 2, by a condenser 19 suitable for the condensation and for collection of the vaporized fraction. The condenser 19 receives, through its inlet 20, the vapors removed from the upper part of the gas outlet column 8, near the intake 11 of the fan 9. At its lower part, the condenser 19 possesses a condensate outlet 21 as well as a device which maintains a constant pressure in the apparatus 1 and consists of a vacuum pump 22 connected to the condenser 19 by a three-way valve 23 which connects the condenser 19 to the atmosphere and/or to the vacuum pump 22. A mist separator 24 is fixed in the gas outlet column 8, underneath the fan 9 and the inlet 20 of the condenser 19, and is accordingly upstream of the condenser and of the fan.

The apparatus shown in the drawing is particularly suitable if the heated heat exchange gas consists of a part of the vaporized fraction, the remainder of which is condensed and collected, and is particularly suitable for the treatment of pasty and thick residues, such as residues of paint, printing inks and varnishes, from which the liquid phase, for example solvent naphtha, has to be recovered. Because the intake 11 of the fan 9 is close to the inlet 20 of the condenser 19, an apportionment takes place, during operation of the apparatus, between the fraction of the vapor phase which is pushed towards the heat exchanger 13 and the fraction of the vapor phase which is condensed in the condenser 19. When the vacuum pump 22, which is preferably a liquid-ring pump, is operating, the apparatus works under vacuum, communication between the pump and the apparatus being provided by means of the three-way valve 23. The same apparatus can however operate under atmospheric pressure if the valve 23 is appropriately adjusted when the vacuum pump 22 is stopped. Because of the fact that the heat exchanger 13 is in contact with a clean gaseous phase, it does not become fouled and remains in good operating condition. Moreover, the heat losses are reduced to the minimum because of the fact that the heat exchanger is fixed inside the heat-insulated chamber 2. It should be noted that the live steam exchanger 13 can be replaced by an electrical heat exchanger specifically designed to avoid explosion hazards.

A gas return line 25, which connects the space occupied by the gas phase of a gas liquid separator vessel 26, attached to the outlet 21 of the condenser 19 and possessing its own liquid outlet 27, to the intake 11 of the fan 9, makes it possible to maintain a circulation of a gas which is non-condensable under the operating conditions, such as nitrogen, contaminated with very small amounts of vapor of the condensate taken off at 27. The fittings which make it possible to operate this embodiment, namely the return line 25 leading back to the fan 9, the gas/liquid separator vessel 26 and its liquid outlet 27 are shown in broken lines in the drawing. Such an arrangement makes it possible, for example, to strip off styrene monomer and condense it, using an inert gas, without polluting the latter with styrene, which might polymerize in contact with the hot surfaces of the heat exchanger.

Though various types and details of embodiments have been described to illustrate the invention, the latter can of course be varied and modified in numerous ways without departing from its scope.

We claim:

1. An automatic and continuous vaporization and condensation process for the fractionation of a mixture comprising at least one liquid volatile fraction comprising the steps of continuously circulating a vapor of the volatile fraction, superheating said continuously circulating vapor, injecting said superheated vapor into the mixture to be fractionated to which it releases its superheated heat for vaporizing at least one liquid fraction condensing and collecting a portion of the vapor of volatile fraction and controlling the ratio of condensed and recirculated volatile fractions so that a substantially constant amount thereof is continuously circulated and superheated.

2. A process according to claim 1, wherein the operations are effected at atmospheric pressure.

3. A process according to claim 1, wherein the operations are effected under pressure less than atmospheric.

4. A process according to claim 1, wherein the operations are effected at superatmospheric pressure.

* * * * *